Patented Jan. 2, 1934

1,942,389

UNITED STATES PATENT OFFICE 1,942,389

PROCESS FOR MAKING BENZOIC ACID

Courtney Conover, St. Louis, Mo., assignor, by mesne assignments, to Monsanto Chemical Company, a corporation of Delaware No Drawing. Application June 18, 1928
Serial No. 286,487

22 Claims. (Cl. 260—108)

This invention relates to the manufacture of benzoic acid.

The object of the invention is to provide a process by which the anhydride of ortho-phthalic acid in the liquid state can be converted into benzoic acid at ordinary pressures.

Broadly stated, my process consists in heating a mixture of molten phthalic anhydride and a suitable catalyst in the presence of water. Portions of the carbon dioxide and benzoic acid produced by the above reaction are withdrawn either continuously or at frequent intervals from the vessel in which the reaction takes place, and phthalic anhydride is added either continuously or periodically at such a rate as to maintain the reaction mixture nearly at constant volume. The temperature at which the reaction mixture is kept may vary over a wide range, the commercially useful limits being approximately from 170° C. to 350° C. When a temperature above approximately 285° C. is employed, it is necessary to keep the reaction mixture under pressure, and above 350° C. other disadvantages are encountered. On the other hand, with temperatures below approximately 220° C., the reaction becomes very slow in the presence of most catalysts. Pressure may be applied to the reaction mixture, even at temperatures below 285° C., but the use of pressures above atmospheric is not necessary in the practical operation of my process.

The water which undergoes reaction may be introduced into the reaction zone in the form of a liquid, vapor, a component of the catalyst, or it may have its origin in a chemically combined form such as phthalic acid (phthalic acid tends to liberate water with the formation of phthalic anhydride at the temperature of the decarboxylation reaction—the equilibrium between phthalic acid and phthalic anhydride and water, favors the formation of the anhydride as the temperature increases).

In its broad sense therefore, the term "water" is to be understood as contemplating water of varied origin including liquid water, steam, as well as water which is liberated or otherwise rendered available under the conditions of the reaction from a combined form as from phthalic acid.

Many substances may be used as decarboxylating catalysts and the catalytic mass may contain several constituents which are catalytically active. It may also contain relatively inert material. I have obtained the best results with compounds of metals of the sixth group of the periodic system, and compounds of aluminum. I have obtained the most rapid reaction when using a compound of chromium. Mixtures of compounds of chromium with compounds of aluminum have also given good results. A suitable mixture of compounds of these metals is one containing the equivalent of three parts of metallic aluminum to the equivalent of one part of metallic chromium. I prefer to add the catalytic metals in the form of oxides, hydroxides or phthalates, but they may be added in other forms.

The benzoic acid may be withdrawn from the reaction vessel continuously or at frequent intervals, either as liquid or vapor, but in any case it should be withdrawn frequently enough so that the percentage of benzoic acid in the molten mixture shall be below 20% at all times. The phthalic anhydride that is used may be substantially pure, or it may be contaminated with the impurities commonly found in crude phthalic anhydride, made by the air oxidation process. The process may be carried out in many different ways and with various kinds of apparatus, without departing from the spirit of my invention.

One procedure which can be followed in carrying out my process is as follows:

Into a covered kettle provided with a stirrer, introduce phthalic anhydride and chromic phthalate in the proportions of 15 parts of chromic phthalate to 100 parts of phthalic anhydride. Apply heat and pass a stream of steam through the kettle to drive out air. When the batch is melted stir rapidly. Heat to a temperature of about 260°. Introduce steam below or near the surface of the reaction mixture at a rate of from 10 to 50 parts by weight per hour for each 100 parts of phthalic anhydride present. Add phthalic anhydride periodically to maintain the volume of liquid in the kettle as nearly constant as practicable. Allow the gaseous mixture of steam, carbon dioxide, benzoic acid vapor, and phthalic anhydride vapor to flow out of the kettle continuously first through a condenser which will condense and return to the kettle, a large part of the phthalic anhydride, and then through a second condenser which will condense the remaining phthalic anhydride, benzoic acid, and water.

Continue the operation, adding phthalic anhydride as needed as long as benzoic acid is formed at a satisfactory rate. When the accumulation of foreign material in the kettle retards the reaction unduly, the operation may be continued for a time by raising the temperature of the reaction mixture. When the reaction mixture shows a tendency to become so viscous as to make thorough stirring difficult, discharge it from the kettle and introduce a new charge.

The condensers mentioned may be of conventional design. I prefer to use a condenser wherein the greater part of the phthalic anhydride is condensed and returned to the kettle. In such a condenser phthalic acid with or without phthalic anhydride is condensed on surfaces maintained at temperatures below the decomposition temperature of phthalic acid, but above the temperature at which benzoic acid will be precipitated from a mixture of benzoic acid vapor, steam, and carbon dioxide in the proportions existing in the gaseous mixture leaving the condenser. The phthalic acid is scraped mechanically from the condenser surfaces and falls back into the kettle.

Attention is drawn to my copending application, Serial Number 668,811, filed May 1, 1933, which is directed broadly to the decarboxylation of polycarboxylic acids and anhydrides in a molten state and to the utilizaiton of compounds of chromium either alone or in combination with other metallic compounds as catalysts for decarboxylating reactions.

Having thus described my invention, what I claim as new and desire to secure by Letters Patent is:

1. A process for making benzoic acid which comprises heating a mixture of molten phthalic anhydride and a decarboxylating catalyst in the presence of water.

2. A process for making benzoic acid which comprises heating and stirring a mixture of molten phthalic anhydride and a decarboxylating catalyst in the presence of steam.

3. A process for making benzoic acid which consists in heating in the presence of water, a mixture comprising a decarboxylating catalyst and molten phthalic anhydride, containing impurities commonly formed in the process for making phthalic anhydride by the oxidation of naphthalene with air.

4. A process for making benzoic acid which comprises heating a mixture of molten phthalic anhydride and a decarboxylating catalyst in the presence of steam at a temperature between 170° C. and 350° C.

5. A process for making benzoic acid which comprises heating a mixture of molten phthalic anhydride and a decarboxylating catalyst in the presence of water, withdrawing benzoic acid from the mixture, and adding phthalic anhydride to the mixture.

6. A process for making benzoic acid which comprises heating a mixture of molten phthalic anhydride and a decarboxylating catalyst in the presence of water, and withdrawing the benzoic acid at such a rate as to prevent the percentage of benzoic acid in the reacting mixture from rising above approximately 20 percent.

7. A process for making benzoic acid which comprises heating a mixture of molten phthalic anhydride and a compound of a metal of the sixth group of the periodic system, in the presence of water.

8. A process for making benzoic acid which comprises heating a mixture of molten phthalic anhydride and a compound of chromium in the presence of water.

9. A process for making benzoic acid which comprises heating a mixture of molten phthalic anhydride and a decarboxylating catalyst in the presence of steam, and continuously withdrawing benzoic acid produced by the above reaction.

10. A process for making benzoic acid which comprises heating a mixture of molten phthalic anhydride and a decarboxylating catalyst in the presence of steam, withdrawing the benzoic acid and phthalic anhydride from the mixture, converting the phthalic anhydride withdrawn to phthalic acid, and returning the said phthalic acid to the reaction mixture.

11. A process for making benzoic acid, which comprises heating a mixture of molten phthalic acid in the presence of water and a compound of a metallic element selected from the group consisting of elements of the sixth group of the periodic system.

12. The method of manufacturing benzoic acid which is characterized in that molten phthalic anhydride and water are caused to react in the presence of a decarboxylating catalyst.

13. The method of manufacturing benzoic acid which is characterized in that molten phthalic anhydride and water are caused to react in the presence of a decarboxylating catalyst, said catalyst including a compound of chromium.

14. The method of manufacturing benzoic acid which is characterized in that molten phthalic anhydride and water are caused to react in the presence of a compound of aluminum.

15. The method as defined in claim 12 and further characterized in that the water is supplied to the molten phthalic anhydride as steam.

16. The method as defined in claim 13 and further characterized in that the water is supplied to the molten phthalic anhydride as steam.

17. The method of manufacturing benzoic acid which is characterized in that a molten mixture of phthalic anhydride and phthalic acid is caused to react with water in the presence of a decarboxylating catalyst.

18. The method as defined in claim 17 and further characterized in that the water is added to the reaction mixture in the form of steam.

19. The method of manufacturing benzoic acid which is characterized in that a molten mixture of phthalic anhydride and phthalic acid are caused to react in the presence of water and a decarboxylating catalyst, said catalyst including a compound of chromium.

20. The method as defined in claim 19 and further characterized in that the water is added to the mixture undergoing reaction in the form of steam.

21. The method of producing benzoic acid and carbon dioxide from phthalic anhydride and water which comprises introducing water into a molten reaction mixture containing phthalic anhydride and a decarboxylating catalyst, the temperature of the reaction mixture and the pressure within the reaction vessel being such as to avoid an accumulation of a liquid water phase.

22. The method as defined in claim 21 and further characterized in that the decarboxylating catalyst embodies a compound of chromium.

COURTNEY CONOVER.